United States Patent [19]
Wallace et al.

[11] Patent Number: 6,152,665
[45] Date of Patent: Nov. 28, 2000

[54] DIRECT TENSION INDICATING WASHERS

[75] Inventors: Ivan Wayne Wallace, Ludlow, Vt.; John A. Herr, West Chesterfield, N.H.

[73] Assignee: Applied Bolting Technology Products, Inc., Ludlow, Vt.

[21] Appl. No.: 09/377,994

[22] Filed: Aug. 20, 1999

[51] Int. Cl.[7] .............................. F16B 31/02; F16B 43/02
[52] U.S. Cl. ........................... 411/11; 411/161; 411/544; 116/212; 116/DIG. 34
[58] Field of Search ...................... 411/9, 10, 11, 411/160, 161, 162, 186–189, 544; 116/212, DIG. 34

[56] References Cited

U.S. PATENT DOCUMENTS

| | | | |
|---|---|---|---|
| 2,191,101 | 2/1940 | Stellin | 411/161 |
| 2,274,010 | 2/1942 | Stellin | 411/161 |
| 2,476,561 | 7/1949 | Pedersen . | |
| 2,781,687 | 2/1957 | Knocke . | |
| 2,850,937 | 9/1958 | Ralston . | |
| 2,943,528 | 7/1960 | Curry | 411/11 |
| 3,187,621 | 6/1965 | Turner . | |
| 3,304,827 | 2/1967 | Bush . | |
| 3,476,009 | 11/1969 | Markey . | |
| 3,948,141 | 4/1976 | Shinjo . | |
| 4,020,734 | 5/1977 | Bell . | |
| 4,072,081 | 2/1978 | Curtis et al. . | |
| 4,149,446 | 4/1979 | Spengler et al. . | |
| 4,322,193 | 3/1982 | Stahl . | |
| 4,347,024 | 8/1982 | Coldren . | |
| 4,498,825 | 2/1985 | Pamer et al. | 411/544 X |
| 4,793,757 | 12/1988 | Peterson | 411/544 X |
| 5,015,132 | 5/1991 | Turner et al. . | |
| 5,056,975 | 10/1991 | Ando | 411/544 X |
| 5,370,483 | 12/1994 | Hood et al. . | |
| 5,667,346 | 9/1997 | Sharp . | |
| 5,769,581 | 6/1998 | Wallace et al. . | |
| 5,931,618 | 8/1999 | Wallace et al. . | |

FOREIGN PATENT DOCUMENTS

| | | |
|---|---|---|
| 52-9757 | 1/1977 | Japan . |
| 1184033 | 3/1970 | United Kingdom . |

*Primary Examiner*—Neill Wilson
*Attorney, Agent, or Firm*—Cantor Colburn LLP

[57] ABSTRACT

A direct tension indicating washer including a body having an internal opening formed therein and at least one arched tab connected to the body. The arched tab has a fixed end integral with the body and a distal end movable with respect to the body. Indicia is formed on the arched tab and when the direct tension indicating washer is tensioned, the arched tab moves away from the body. Alignment of the indicia with a reference indicates proper tension. Another embodiment of the invention is a direct tension indicating washer having a body having an internal opening formed therein and at least one arch connected to the body. The arch has a first end integral with the body, a second end integral with the body and an intermediate portion between the first end and second end. The intermediate portion is positioned above a top surface of the body. The arch is configured to deform upon application of a predetermined amount of force to form a deformed arch indicating that a predetermined amount of bolt tension has been achieved.

13 Claims, 6 Drawing Sheets

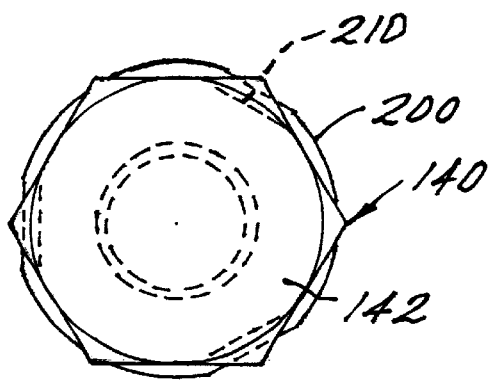
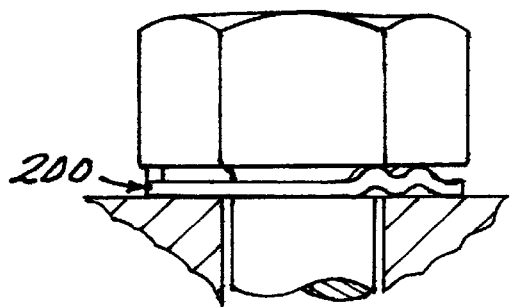
FIG. 16  FIG. 17
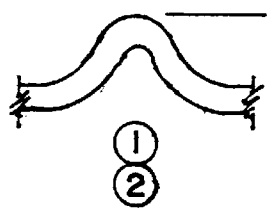
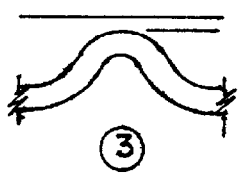
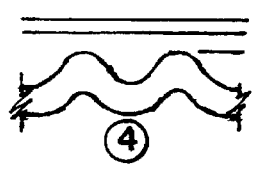
FIG. 18  FIG. 19  FIG. 20

DIRECT TENSION INDICATING WASHERS

BACKGROUND OF THE INVENTION

The invention relates in general to direct tension indicating washers and in particular to direct tension indicating washers that self indicate when the proper bolt tension has been achieved.

High strength metal bolts, along with their corresponding nuts, when used in metal connections, are almost always intended to be installed so that they are "tensioned." The "tensioning" is usually accomplished by turning the nut relative to the bolt a specified amount of rotation or until a certain torque resistance has been reached. The tension in the bolt stretches the bolt and compresses the connection plates between the bolt head and nut so the connection plates do not slip relative to each other. It is this slip resistance which holds structures such as bridges and buildings together.

FIG. 1 is a top view of a conventional direct tension indicating washer 10, commonly referred to as a DTI. The direct tension indicating washer 10 includes a series of protuberances 12 formed on a first surface 14. As shown in FIG. 2, corresponding indentations 16 are formed in a second surface 18 of the direct tension indicating washer 10. As shown in FIGS. 3 and 4, the direct tension indicating washer 10 is manufactured through a stamping operation in which the blank metal washer 10 is placed between a tool 20 and a die 22. Pressure is applied to the tool 20 (e.g. by a press) and a protrusion 24 on the tool 20 creates the protuberance 12, and the corresponding indentation 16, in the direct tension indicating washer 10 as shown in FIG. 4.

The DTI is manufactured so that when the tightening of the bolt forces the protrusions 12 to compress, or reduce height, sufficiently, the bolt is said to have sufficient tension to meet code requirements. Determination of "sufficient" protrusion compression is accomplished in the field by the attempt to insert a feeler gage of specified thickness (e.g. 0.015") into the residual gap between the underside of the bolt head and the first surface 14 of the DTI. FIG. 1A shows a feeler gage being placed on a first surface of a direct tension indicating washer to test bolt tension (the bolt is not shown for clarity). If the attempt to insert the feeler gage is unsuccessful, that is, the inspector cannot insert the feeler gage into the gap half way radially around the DTI circumference between the DTI protuberances, the residual DTI gap (the space between the first surface of the direct tension indicating washer and the bottom of the bolt head) is said to be, on average, of dimension less than the thickness of the feeler gage, and is therefore judged acceptable. Conventional direct tension indicating washers are manufactured so that surfaces 14 and 18 are parallel and perpendicular to the longitudinal axis of the bolt which they are made to fit on, that is when the bolt is inserted through the inner diameter.

Conventional direct tension indicating washers, though well suited for their intended purposes, have several drawbacks. First, the process of attempting to insert the feeler gage into the DTI gap is time consuming and must be done after the bolt installer has stopped the tightening process. Second, over time, bolt tension declines as the bolt/nut threads seat into the mating steel surfaces and as external loads shake the connections and try to pry the bolt/nut apart. This problem is especially prominent in connections that are subject to vibration such as bridges, structures subject to earthquakes, connections supporting moving cranes and other equipment, etc. As the bolt tension declines, so does the clamping force and the capacity to carry external loads by resistance to slip. The conventional direct tension indicating washer 10 is flat and has the disadvantage that, after bolt installation, the protrusions 12 are essentially flattened inelastically and will not spring back to their original positions if the bolt begins to loose tension.

In addition, the conventional direct tension indicating washer, when manufactured in relatively small sizes (e.g. for a ¼ inch diameter bolt), does not function reliably because of the difficulty in accurately using a feeler gauge with such small washers. Also, the relatively small direct tension indicating washers cannot accurately indicate low bolt tensions (typically used with small bolts) due to the process of fabricating the protuberances. Accordingly, there is a need in the art for improved direct tension indicating washers.

SUMMARY OF THE INVENTION

The above-discussed and other drawbacks and deficiencies of the prior art are overcome or alleviated by the direct tension indicating washers of the present invention. One embodiment of the invention is a direct tension indicating washer including a body having an internal opening formed therein and at least one arched tab connected to the body. The arched tab has a fixed end integral with the body and a distal end movable with respect to the body. Indicia is formed on the arched tab and when the direct tension indicating washer is tensioned, the arched tab is pushed out circumferentially from the body. When the indicia is aligned with a reference (e.g., the periphery of the washer body), this indicates proper tension.

Another embodiment of the invention is direct tension indicating washer having a body having an internal opening formed therein and at least one arch connected to the body. The arch has a first end integral with the body, a second end integral with the body and an intermediate portion between the first end and second end. The intermediate portion is positioned above a top surface of the body. The arch is configured to deform through snap-through buckling upon application of a predetermined amount of force to form a deformed arch indicating that a desired amount of bolt tension has been achieved.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 16 is a top view of the direct tension indicating washer of FIG. 13 installed;

FIG. 17 is a side view of the direct tension indicating washer of FIG. 13 installed and tensioned;

FIGS. 18–20 depict the arch of the direct tension indicating washer of FIG. 13 during installation;

DETAILED DESCRIPTION

Figure 1:
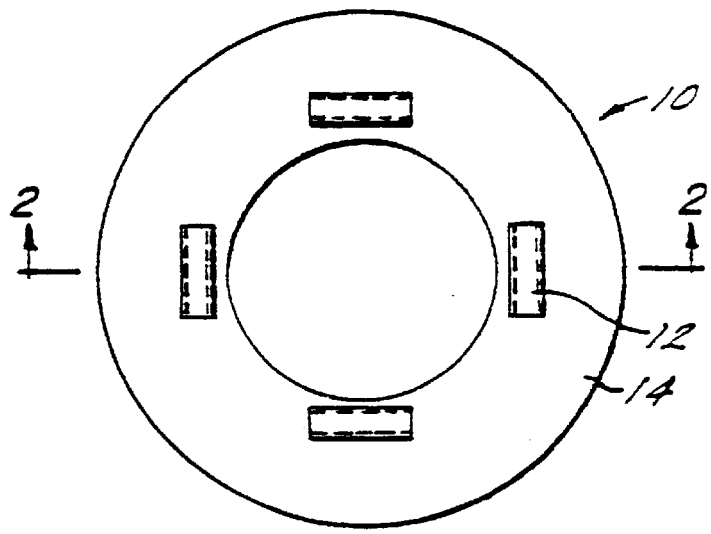
FIG. 1 is a top view of a conventional direct tension indicating and maintaining washer.
Figure 1A:
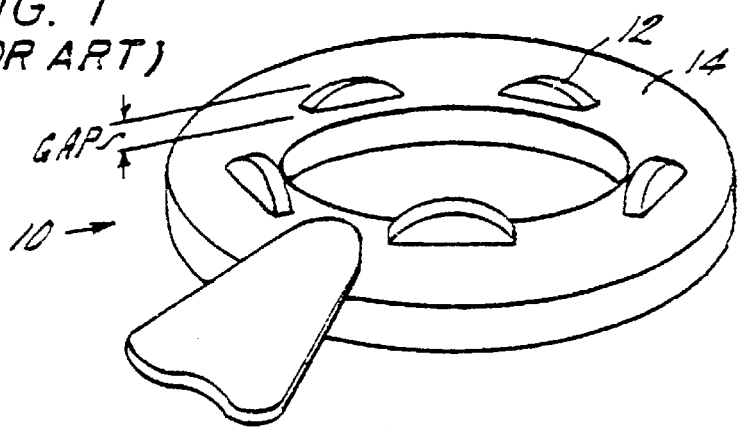
FIG. 1A is a perspective view of the use of a feeler gage to test bolt tension.
Figure 2:
FIG. 2 is a cross-sectional view of the direct tension indicating and maintaining washer shown in FIG. 1 taken along line 2—2.
Figure 3:
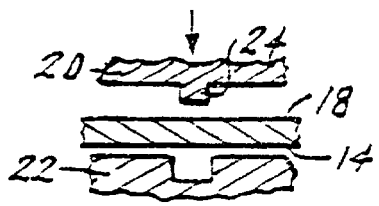
FIGS. 3 and 4 illustrate a process for creating the protuberances/indentations in the conventional direct tension indicating and maintaining washer.
Figure 4:
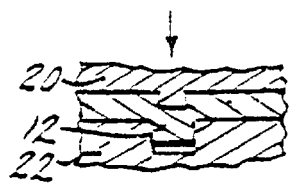
Figure 5:
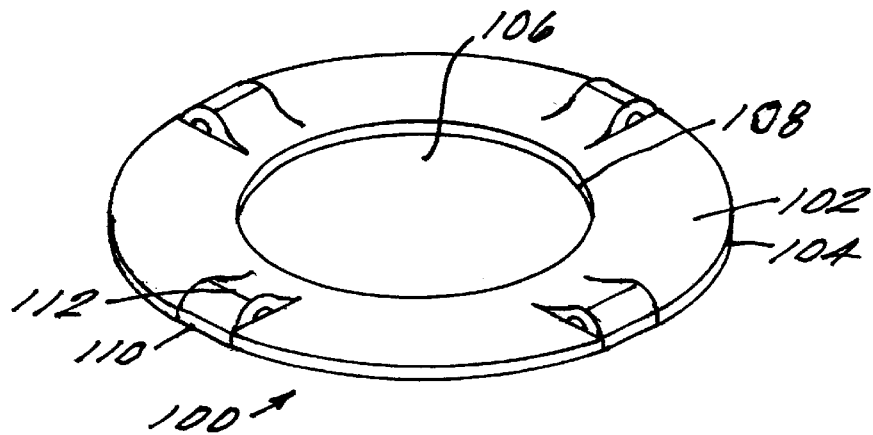
FIG. 5 is a perspective view of a direct tension indicating washer in a first embodiment.

FIG. 5 is a perspective view of a direct tension indicating washer shown generally at 100. The direct tension indicating washer 100 includes a circular body 102 having an outer edge 104. An interior opening 106 is formed in the body 102 which defines an inner edge 108. The direct tension indicating washer 100 includes one or more arched tabs 110 each having indicia 112. The arched tabs 110 extend above a top surface of the body 102. The indicia 112 may be a line or other visible marking. The indica 112 may also include a plurality of indicia each indicating a different amount of tension. As described herein, when the direct tension indicating washer 100 is placed under a bolt head and the bolt is tensioned, the indicia 112 is move radially away from the body 102. When the indicia is aligned with a reference such as the outer edge 104, this indicates that proper bolt tension has been achieved. The process of forming the direct tension indicating washer 100 will now be described.

Figure 6:
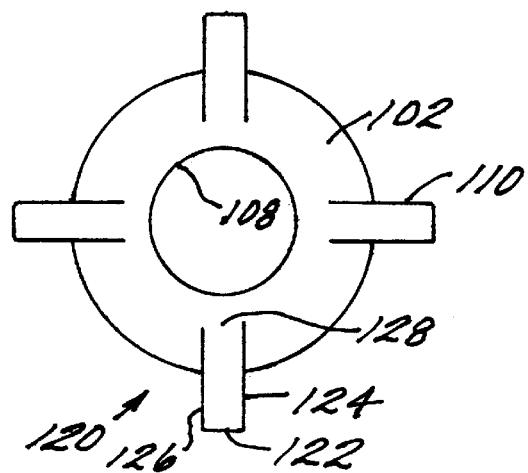
FIG. 6 is top view of a blank used to form the direct tension indicating washer of FIG. 5.
Figure 7:
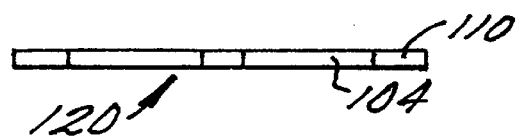
FIG. 7 is a side view of the blank of FIG. 6.

FIG. 6 is a top view of a blank 120 which is used to form the direct tension indicating washer 100. Blank 120 includes body 102 as described with reference to FIG. 5. Tabs 110 are initially coplanar with body 102. The blank 120 is stamped out of a material (e.g., metal) to form body 102 and one or more tabs 110. As shown in FIG. 6, tabs 110 have a fixed end 128 where the tab 110 meets body 102. Tab 110 also includes two sides 124 and 126 free from body 102 through shearing or cutting body 102. The distal end 122 of the tab 110 extends beyond the periphery of body 102. Thus, the tab 110 is secured to the body 102 at one fixed end 128 but otherwise is free to move relative to body 102. The tabs 110 may be positioned equally around the periphery of body 102. FIG. 7 is a side view of the blank 120.

Figure 8:
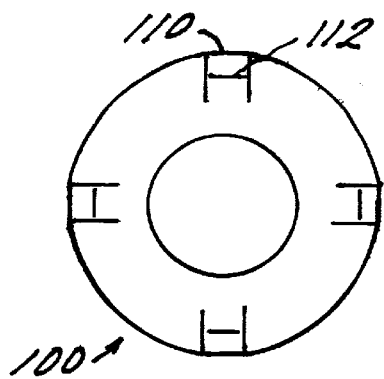
FIG. 8 is a top view of a direct tension indicating washer after forming arched tabs.
Figure 9:
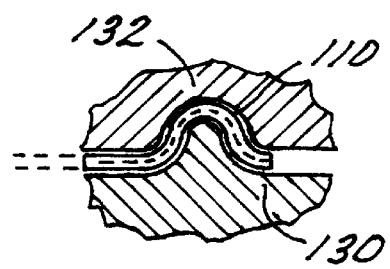
FIG. 9 depicts the formation of an arched tab.

FIG. 8 is a top view of direct tension indicating washer 100. The blank 120 is coined such that the tabs 110 are formed into arches and at the same time the indicia 112 is formed on each tab 110. FIG. 9 depicts formation of one arched tab. The flat tab 110 is compressed between an anvil or tool 130 and a die 132 to form the arch shape. The die 132 may include a feature that forms indicia 112 on the top surface of the arched tab 110. The distal end 122 may be aligned with the outer edge 104 of body 102. A difference between the arched tabs 110 and protuberances formed on conventional direct tension indicating washers is that the conventional protuberances are formed by extrusion whereas the tabs 110 are separate from body 102 by shearing at sides 124 and 126. As described in detail below, this allows the direct tension indicating washer 100 to detect lower bolt tension that conventional direct tension indicating washers.

Figure 10:
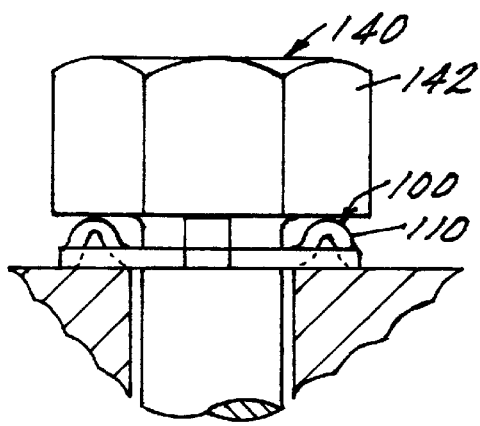
FIG. 10 is a side view of the direct tension indicating washer of FIG. 8 installed and untensioned.
Figure 11:
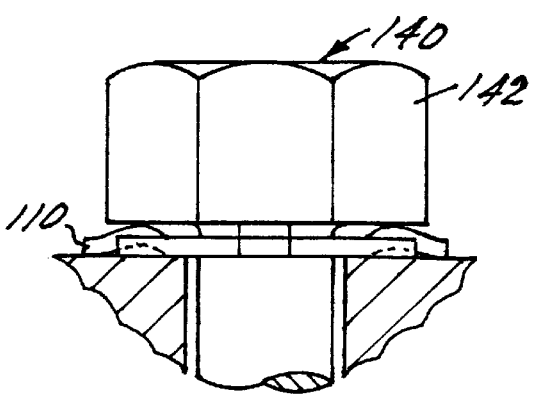
FIG. 11 is a side view of the direct tension indicating washer of FIG. 8 installed and tensioned.
Figure 12:
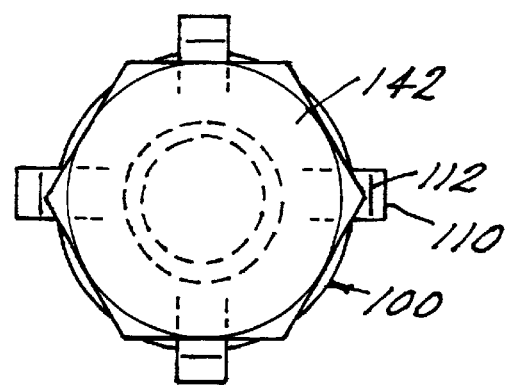
FIG. 12 is a top view of FIG. 11.

FIG. 10 depicts the direct tension indicating washer 100 positioned beneath a bolt 140 having bolt head 142. In an untensioned state, the arched tabs 110 are in an original state and the indica 112 are positioned beneath the bolt head 142 and are not visible to the user. FIG. 11 depicts the direct tension indicating washer 100 upon tensioning of bolt 140. As shown in FIG. 11, as the bolt 140 is tensioned, the underside of the bolt head 142 presses against arched tab 110. The arched tab 110 is deflected such that the arch is flattened and the distal end 122 moves away from the fixed end 128 and the outer edge 104 of body 102. As shown in FIG. 12, eventually the indicia 112 on the top of arched tab 110 becomes aligned with a reference such as the outer edge 104 of body 102. The shape of arched tab 110 is controlled so that the indicia 112 is aligned with a reference such as outer edge 104 upon achieving a predetermined bolt tension.

The direct tension indicating washer 100 provides several advantages over conventional direct tension indicating washers. The direct tension indicating washer 100 is able to record bolt tension lower than that recordable with conventional direct tension indicating washers. Conventional direct tension indicating washers form protuberances through extrusion. To compress these conventional protuberances requires relatively large force in the form of high bolt tensions. By contrast, the arched tabs 110 are formed by shearing the body 102 at tab sides 124 and 126. The arched tabs 110 are displaced by deforming or bending tab 110 which requires relatively lower force or bolt tension. Accordingly, the direct tension indicating washer 100 can by used in low tension applications where conventional direct tension indicating washers are impractical.

The direct tension indicating washer 100 also operates without the use of a feeler gauge. Low bolt tension applications usually use smaller bolts than large bolt tension applications. In these low bolt tension applications, it is difficult to use a feeler gauge given the small dimension of the bolt and bolt head. The direct tension indicating washer 100 indicates when the proper bolt tension has been achieved without the use of feeler gauges or other external apparatus.

The direct tension indicating washer 100 will also maintain bolt tension. The shape of the arched tabs 110 will react elastically even under low load situations over a large deflection whereas conventional protuberances are not elastic. The elastic nature of the arched tabs 110 maintain tension on the bolt by exerting a force on the underside of the bolt head to help counteract reduction in bolt tension due to vibration, seating of the threads and material deformation of the clamped material. The elastic nature of the arched tabs 110 results in the arched tab 110 following the bolt head as the bolt head moves away from the surface of the clamped material.

Figure 13:
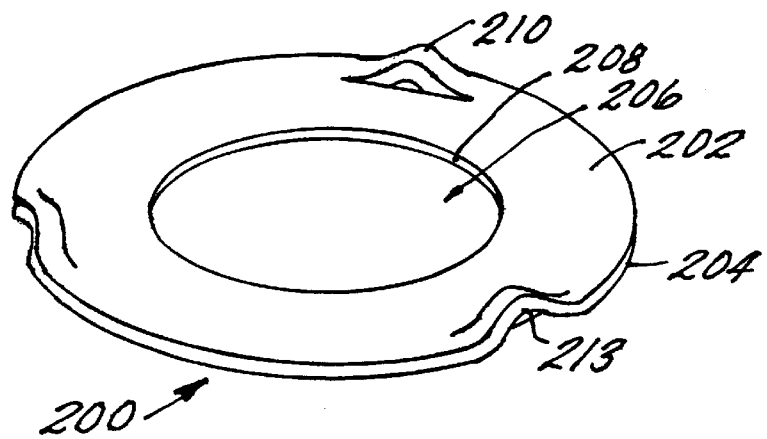
FIG. 13 is a perspective view of a second embodiment of the invention.
Figure 14:
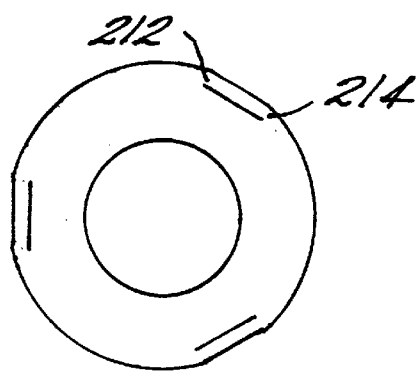
FIG. 14 is a top view of the direct tension indicating washer of FIG. 13.
Figure 15:
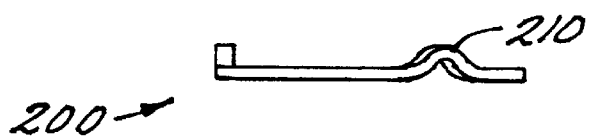
FIG. 15 is a side view of the direct tension indicating washer of FIG. 13.

FIG. 13 is a perspective view of a direct tension indicating washer 200 in a second embodiment of the invention. The direct tension indicating washer 200 includes a circular body 202 having an outer edge 204. An interior opening 206 is formed in the body 202 which defines and inner edge 208. Positioned about the periphery of body 202 is one or more arches 210. Arch 210 is a strip of material having a first end 212 integral with body 202 and a second end 214 integral with body 202. An intermediate portion 213 of the arch 210 positioned between the first end 212 and the second end 214 is positioned above the top surface of body 202. The arch 210 has a length between ends 212 and 214 that is greater than the length of the outer edge 204 for a similar arc. The arch 210 is formed by shearing the body 202 a predetermined distance from the outer edge 204 for a predetermined length. The arch 210 is then formed though a stamping process using a tool and die. The majority of the arch 210 is positioned above the plane of body 202. The arches 210 may be spaced equally around the periphery of body 202. FIG. 14 is a top view of the direct tension indicating washer 200 and FIG. 15 is a side view of the direct tension indicating washer 200.

FIG. 16 is a top view of the direct tension indicating washer 200 positioned beneath a bolt 140 having a bolt head 142. As shown in FIG. 16, the arches 210 are positioned beneath the bolt head 142. Direct tension indicating washer 200 indicates bolt tension based on the shape of arches 210. As the bolt 140 is tensioned, the underside of bolt head 142 applies pressure to the peak of arch 210. At a predetermined tension level, the arch 210 will deform to an undulating shape in which the peak of the arch 210 has been inverted and the arch 210 now has two peaks separated by a valley. FIG. 17 depicts an installed direct tension indicating washer 200 in which the desired bolt tension has been achieved and the arch 210 has deformed.

This type of deformation may be referred to as "snap-through buckling" and is also known as oil canning. Snap-through buckling is a known property of arch shapes and the arch compression at which snap-through buckling occurs can be calculated by known mechanics of materials formulas. The amount of compression needed to deform arches 210 is controlled by the number and proportions of the arches. When the arch 210 has deformed, the installer knows that the proper tension has been achieved.

Figure 21:
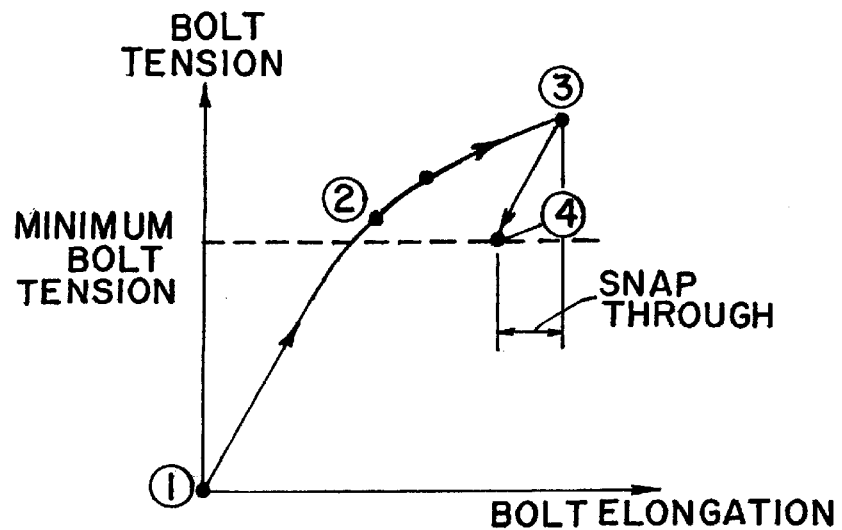
FIG. 21 is a graph of bolt tension versus bolt elongation for the direct tension indicating washer of FIG. 13.
Figure 22:
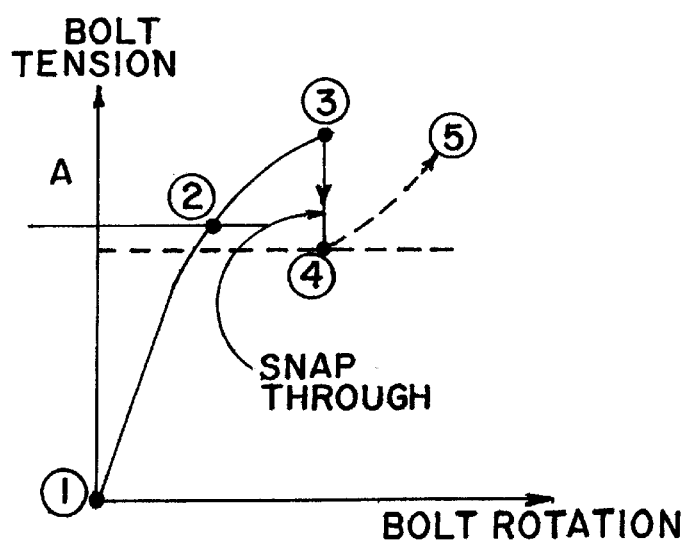
FIG. 22 is a graph of bolt tension versus bolt rotation for the direct tension indicating washer of FIG. 13.

FIGS. 18–20 depict the deformation of an arch 210. Initially, the arch 210 is in its original state as shown in FIG. 18 and as tension is applied to the bolt, the arch 210 compresses somewhat as shown in FIG. 19. The numbers in FIGS. 18–20 correspond to positions along curves shown in FIGS. 21 and 22. As shown in FIGS. 21 and 22, bolt tension and bolt elongation increase as the bolt is tightened and force is applied to arch 210. When the arch 210 deforms or snaps through as shown in FIG. 20, the bolt tension shown in FIG. 21 reduces to a minimum bolt tension and the bolt elongation reduces slightly. The elastic nature of arch 210 provides force on the underside of bolt head 142 and prevents the bolt tension from going below a minimum level. To increase bolt tension after the deformation of arch 210, the installer may turn the bolt a predetermined amount (e.g. one rotation) to take up any loss in bolt tension as shown in FIG. 22 as a transition from state 4 to 5.

The direct tension indicating washer 200 provides advantages over conventional direct tension indicating washers. The direct tension indicating washer 200 is able to record bolt tension lower than that recordable with conventional direct tension indicating washers. Conventional direct tension indicating washers form protuberances through extrusion. To compress these conventional protuberances requires relatively large force in the form of high bolt tensions. By contrast, the arches 210 are formed by shearing the body 202. The arches 210 are deformed by compressing the arch which requires relatively lower force or bolt tension. Accordingly, the direct tension indicating washer 200 can by used in low tension applications where conventional direct tension indicating washers are impractical.

The direct tension indicating washer 200 also operates without the use of a feeler gauge. Low bolt tension applications usually use smaller bolts than large bolt tension applications. In these low bolt tension applications, it is difficult to use a feeler gauge given the small dimension of the bolt and bolt head. The direct tension indicating washer 200 indicates when the proper bolt tension has been achieved without the use of feeler gauges or other external apparatus. The installer can feel the arch snap-through (transition from FIG. 19 to FIG. 20) and thus knows that a predetermined amount of tension has been achieved.

The direct tension indicating washer 200 is also useful in applications where a tension threshold should not be exceeded. The number and shape of the arches 210 can be controlled to deform upon reaching the maximum tension threshold. As shown in FIG. 21, when the arch deforms or snaps through, some tension is lost. Accordingly, the direct tension indicating washer 200 can ensure that the maximum tension threshold is not exceeded by releasing tension at a certain point.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A direct tension indicating washer comprising:
   a body having an internal opening formed therein; and
   at least one arched tab connected to said body, said arched tab having a fixed end integral with said body and a distal end movable with respect to said body; and
   indicia formed on said at least one arched tab.

2. The direct tension indicating washer of claim 1 wherein:
   said at least one arched tab includes a plurality of arched tabs.

3. The direct tension indicating washer of claim 1 wherein:
   said indicia is a line.

4. The direct tension indicating washer of claim 3 wherein:
   said indicia is a plurality of indicia.

5. The direct tension indicating washer of claim 1 wherein:
   said arched tab is configured such that said indicia is aligned with a reference upon achieving a predetermined bolt tension.

6. The direct tension indicating washer of claim 5 wherein:
   said reference is an outer edge of said body.

7. The direct tension indicating washer of claim 1 wherein said arched tab extends in a radial direction and said distal end extends beyond an outer edge of said body upon achieving a predetermined bolt tension.

8. A direct tension indicating washer comprising:
   a body having an internal opening formed therein; and
   at least one arch connected to said body, said arch having a first end integral with said body, a second end integral with said body and an intermediate portion between the first end and second end, said intermediate portion extending along a length of said arch positioned above a top surface of said body;

wherein there are no slits cut transversely into said arch and said arch is configured to deform upon application of a predetermined amount of force to form a deformed arch.

9. The direct tension indicating washer of claim 8 wherein:

said at least one arch includes a plurality of arches.

10. The direct tension indicating washer of claim 9 wherein:

said plurality of arches are equally spaced around said body.

11. The direct tension indicating washer of claim 8 wherein:

said deformed arch includes two peaks separated by a valley.

12. A direct tension indicating washer comprising a body having an internal opening formed therein; and at least one arch connected to said body, said arch having a first end integral with said body, a second end integral with said body and an intermediate portion between the first end and second end, said intermediate portion positioned above a tope surface of said body;

wherein said arch is configured to deform upon application of a predetermined amount of force to form a deformed arch, said deformed arch includes two peaks separated by a valley.

13. A direct tension indicating washer formed by forming at least one arch by shearing a flat body along at least one shear line for each arch, said body separating at said shear line forming an aperture between said body and said arch along said shear line; each said arch being connected only at both ends to said body and extending away from a plane in which said body lies.

* * * * *